March 17, 1959  L. O'NEAL MITCHELL  2,878,092
EDUCATIONAL SYSTEM AND APPARATUS
Filed April 29, 1955  5 Sheets-Sheet 5

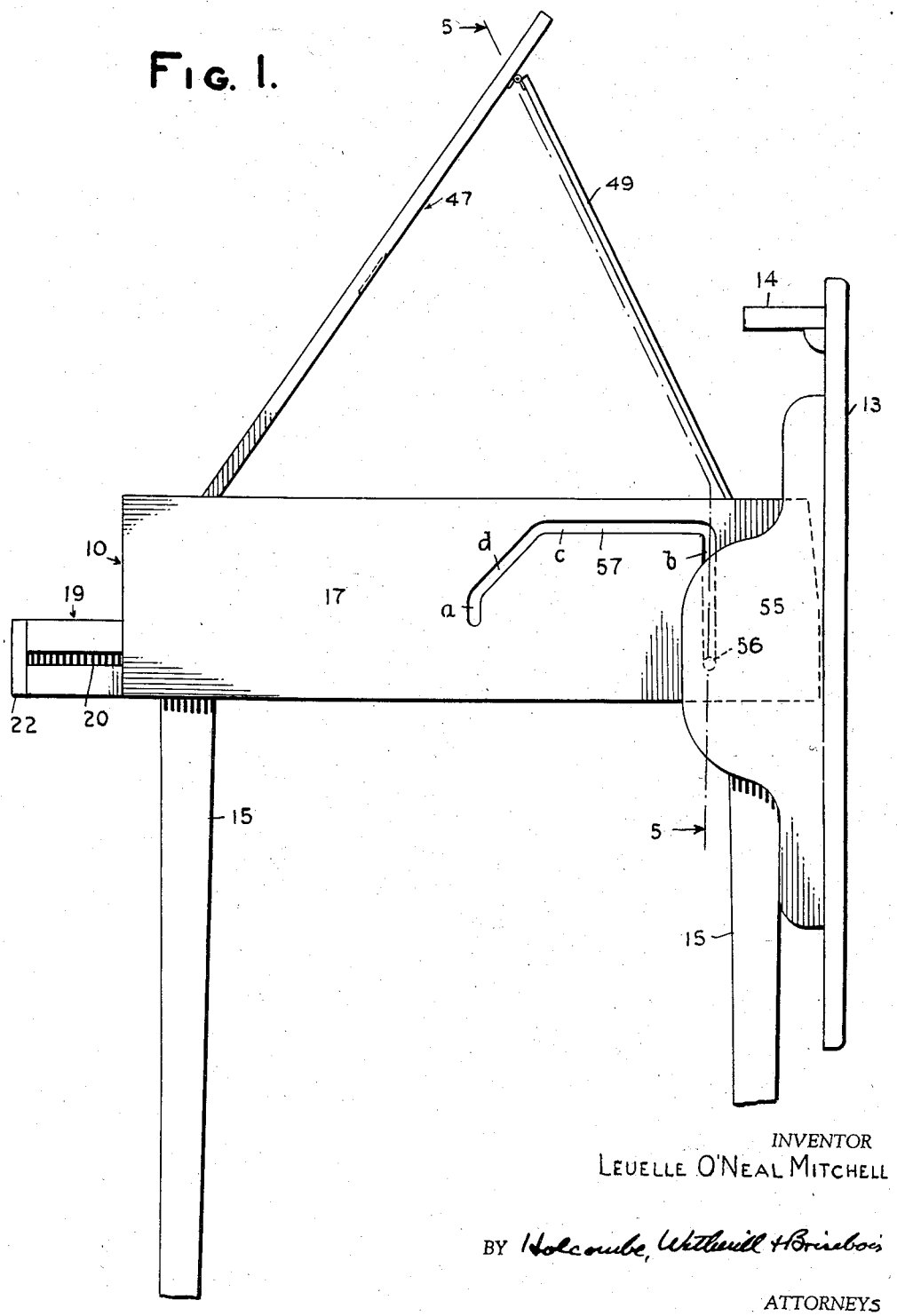

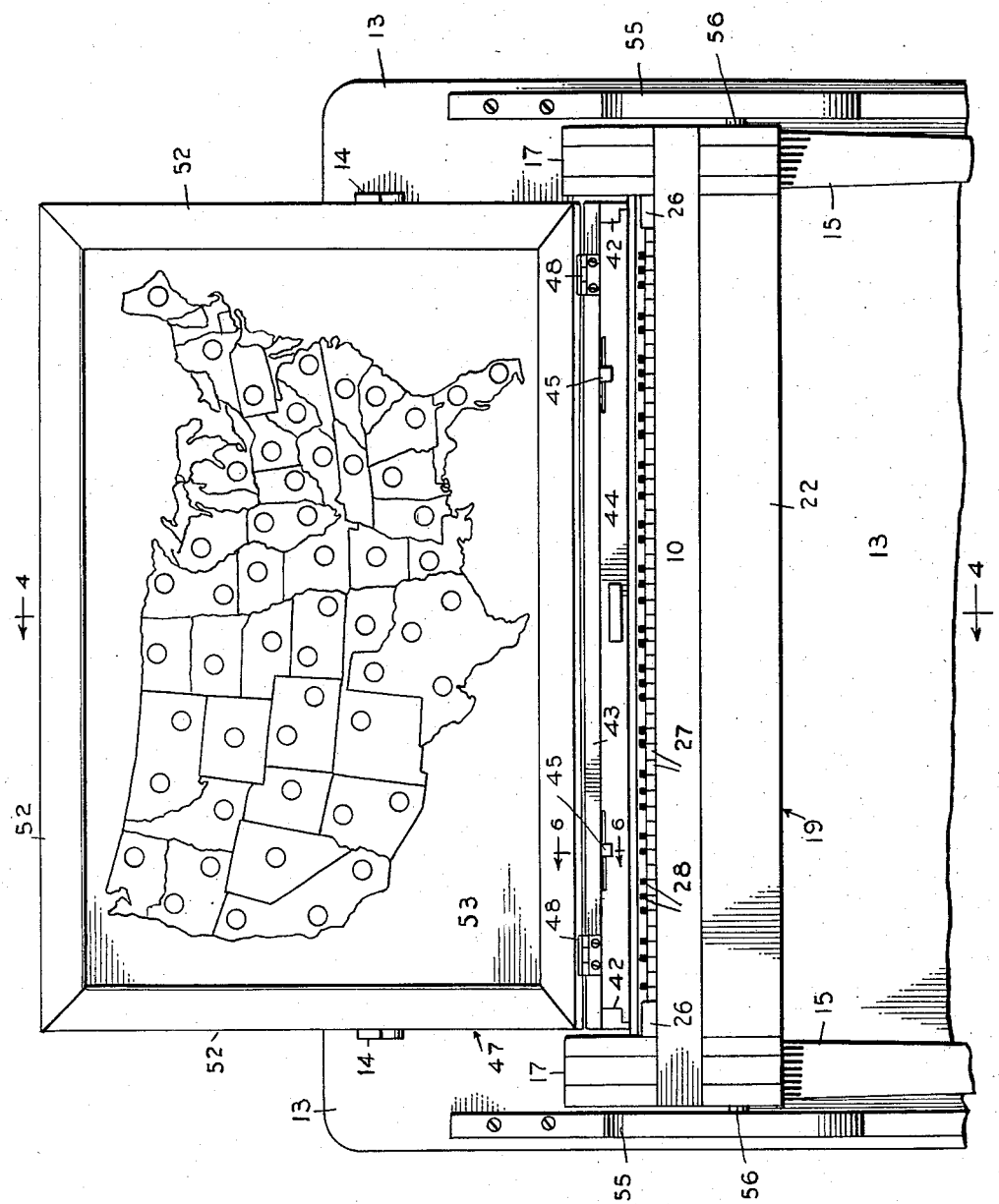

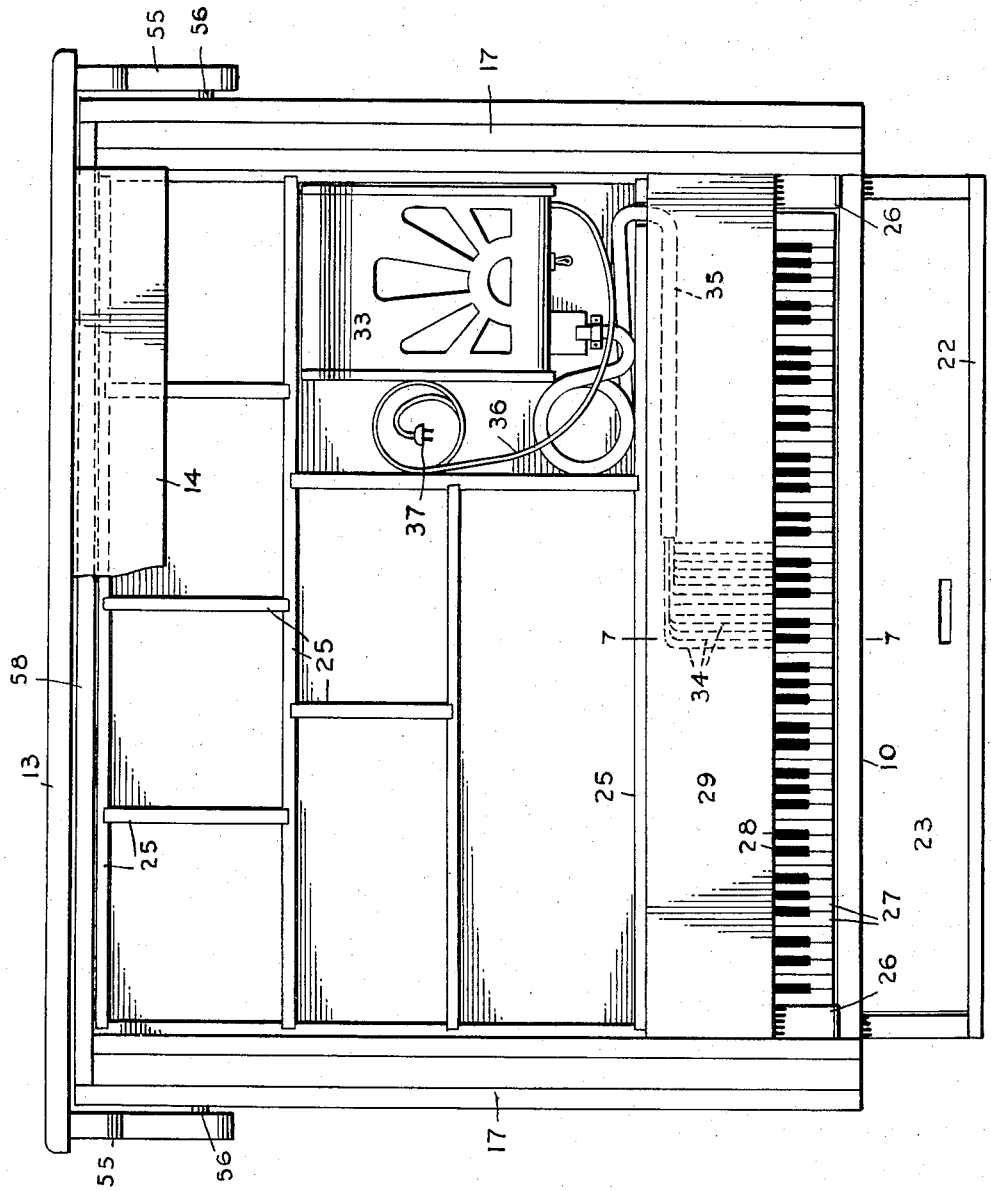

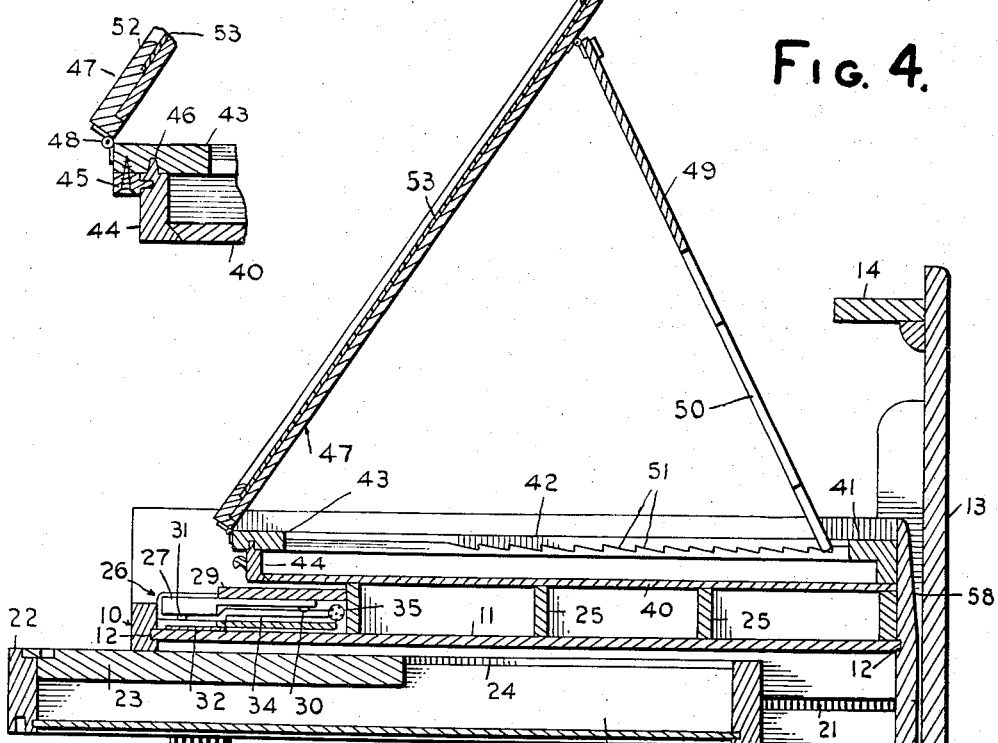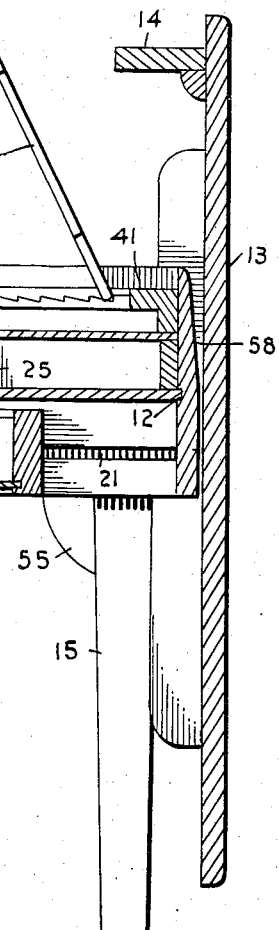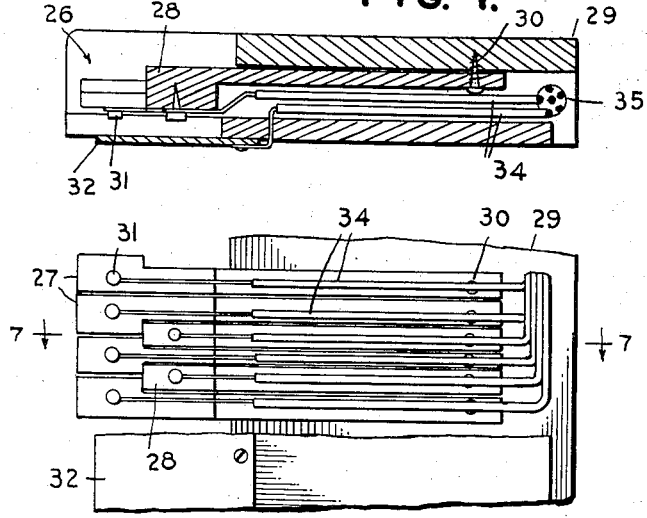

INVENTOR
LEUELLE O'NEAL MITCHELL

BY *Holcombe, Wetterill & Brisebois*

ATTORNEYS

United States Patent Office 2,878,092
Patented Mar. 17, 1959

2,878,092

EDUCATIONAL SYSTEM AND APPARATUS

Leuelle O'Neal Mitchell, Tampa, Fla.

Application April 29, 1955, Serial No. 504,959

2 Claims. (Cl. 312—310)

This invention relates to educational systems particularly adapted for classroom instruction, and to apparatus useful in connection with the instruction of both young and older children in school and cultural subjects taught in the pre-college years, including language, numbers, music, business, art, geography, bird and animal life, and other subjects susceptible of graphical or pictorial illustration.

The invention comprises a receptacle having compartments for holding the materials used in the system and which, if desired, can be knocked down and moved from place to place and set up to serve as a combined writing desk and practice cabinet or easel for displaying charts and other paraphernalia for instruction purposes.

The invention also comprises a method of instruction employing movable letters, figures, notes and symbols or pictures illustrating different subjects of study and susceptible of arrangement by the teacher and the child in significant relationship with each other and with a suitable background such as may be provided on a series of charts for memory exercises and for development of mechanical skill, thereby maintaining the interest of the pupil in the subject and stimulating imitative and creative work.

The invention further includes improvements in the materials and devices employed in the system with the objects of increasing their attractiveness and effectiveness, lengthening their useful service and reducing their cost.

Other aims and advantages of the invention appear in connection with the following description of a preferred embodiment thereof illustrated in the accompanying drawings, wherein:

Figure 1 is a side view of a combined knock-down receptacle, table and desk, forming a demonstration unit, shown in open position in the figure;

Figure 2 is a front view and Figure 3 is a top view of the same, part of the top being broken away and the display fixture removed to disclose the arrangement of the interior compartments in Figure 3;

Figure 4 is a vertical cross-section of the combination receptacle and desk on the line 4—4 of Figure 2.

Figure 6 is a detail view in cross-section of the front of the display easel on the line 6—6 of Figure 2;

Figure 7 is a vertical cross-section of the practice keyboard on the lines 7—7 of Figure 3 and Figure 8; and Figure 8 is a bottom view of a portion of the practice keyboard, with a part of the base and contact plate broken away to disclose the contact points on the undersides of the keys.

Figure 5:
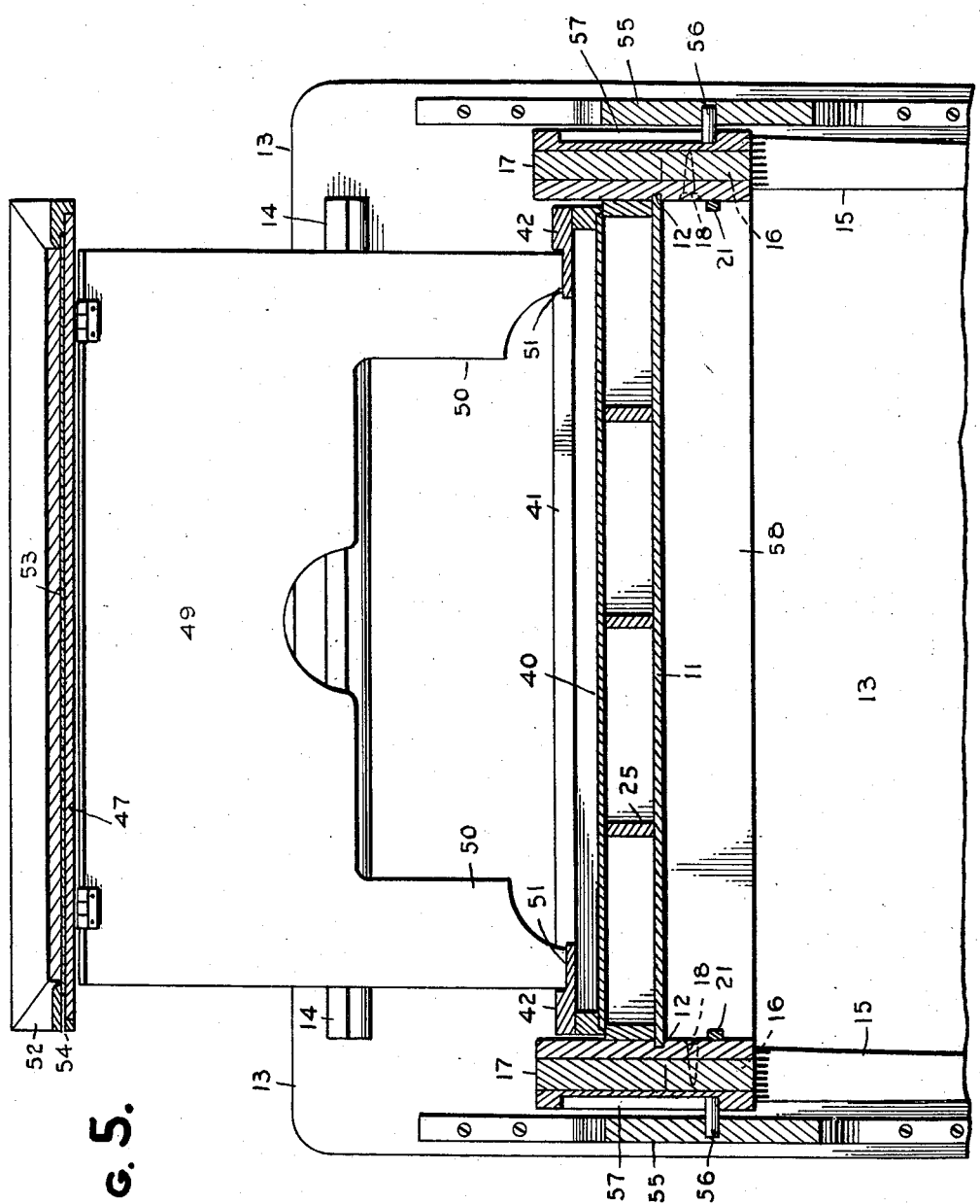
Figure 5 is a transverse cross-section of the same on the line 5—5 of Figure 1.

In the system exemplified herein one pupil sits at the front side of the open demonstration unit, the teacher stands at the side or rear in convenient reach of the chart and materials used in the system, and other pupils may gather around and observe the exercise, making such suggestions and answering such questions as may be pertinent to the subject matter of the lesson, or the unit may be used individually by each scholar.

The demonstration unit, herein termed a desk for short, comprises a four sided receptacle having a front wall 10, an open bottom closed by a shelf 11 spaced above the lower edge of the receptacle and supported in grooves 12 in the side and rear walls thereof, and a rearwardly slidable hinged cover or top 13 provided with a front wall 14 partly covering the front side of the receptacle above the wall 10 in closed position. The receptacle is supported on four demountable legs 15, the upper ends of which are provided with tenons 16 engaging in mortises in the side walls 17 of the receptacle and secured by screws 18 when set up for use, as shown in Figure 5. When demounted the legs fit snugly within the body of the receptacle in the space adjacent to the easel unit hereinafter described.

A drawer or hollow shelf 19 is fitted in the open bottom part of the receptacle 10, having grooves 20 in its side walls which slide between tracks or bead strips 21 on the inner sides of the receptacle, so that the drawer may be pulled forward to form a low table or support for writing materials or a portable typewriter. The front wall 22 of this hollow shelf 19, when pushed into the receptacle as far as it will go, is flush with and serves as a lower portion of the front wall 10 of the receptacle. A slide 23, supported at its ends on the grooved upper edge 24 of each side member of the hollow shelf 19, extends over one half of the drawer and when pulled forward provides a flat surface for writing or working and covers and protects the contents of the drawer when open.

The middle compartment of the receptacle is divided by partitions 25 into individual spaces to suit the various materials used in the system. The front space therein may be used to house a practice keyboard unit 26 fitted with miniature piano keys, there being fifty-two white keys 27 and thirty-six black keys 28 as in a conventional piano. In the keyboard unit illustrated, the keys are made of flexible wood and are secured at their inner ends to the under side of the top board 29 of the keyboard unit by means of screws 30, as shown in Figs. 7 and 8. Such a keyboard may readily be housed in a narrow space extending across the entire front of the middle compartment as shown in Figs. 3 and 4.

This middle compartment also provides room for a mechanical tone device if desired coupled to at least one octave of the keyboard. In the device illustrated, the keys of the middle octave are provided with electrical contacts 31 which, when the keys are depressed in playing or practice, strike against a metal contact plate 32, included in an electrical circuit with the tone producing elements of a pitch sounding device mounted in a suitable cabinet 33. A separate lead wire 34, which may be enclosed in a multiple conductor flexible cable 35, leads from each key of this middle octave to the corresponding one of a set of thirteen electrical tone producing elements conforming respectively to the pitch of each note.

A conventional flexible cable 36 with a double prong plug connection 37 is provided for furnishing electric power to the tone producing devices, which are of well known construction and are not shown in the drawings. The tone cabinet 33 is preferably fitted in one of the spaces in the middle compartment of the receptacle body for safe storage and transportation, and may be removed if desired and set up on the top of the receptacle or other convenient place when in use.

In the space in the receptacle body above the compartments formed by the partitions 25 is fitted a display fixture of the easel type having a hollow base consisting of a bottom 40, back and side frames 41, 42, and front frame 43. A removable front wall 44 is normally held in place by thumb latches 45 and a tongue 46 fitting in a groove in the under side of the front frame 43 as shown in Fig. 6. The space within the hollow base may be used for storing the charts used in the system.

A hinged top 47 normally closes the easel fixture, the hinges 48 which connect the top to the front frame 43 permitting the top to be raised sufficiently to serve as a support for the charts used in the system. An adjustable brace 49, having two legs 50 engaging in toothed and notched racks 51 one on each side frame 42, is hinged at its back edge to the under side of the top 47 near its rear edge to fold under the top when the latter is closed, there being ample space within the base of the easel fixture between the racks 51 and the top 47 for this purpose.

The hinged top 47 is provided with an encircling frame 52 which is notched along its inner border on three sides to receive and hold a chart 53, the fourth side being provided with a narrow space or opening 54 between it and the front or exposed face of the top 47 to permit the insertion and removal of charts as desired. The easel and base 40 are removable as a unit from the receptacle body, and can be carried around with a supply of charts and materials. When folded down, the easel unit fits snugly beneath the hinged top 13.

The sliding top 13 is preferably connected to the side walls 17 of the receptacle body by means of wing members 55, fixed to the top by means of screws or other securing means and depending one on each side from the under side of the top to embrace loosely the outer sides of the side walls 17. Pins 56, of suitable size and strength to support the top when opened, are fixed one in each wing member 55 and project into grooved tracks 57 in the outside faces of the side walls 17, as shown in Figs. 1 and 5. The tracks 57 may be formed of metal suitably fitted into the walls 17 or otherwise constructed for strength and serviceability.

In order to conserve space in opening and closing the top and in conducting class exercises, the tracks 57 are shaped to permit the cover to be lifted vertically in front sufficiently to clear the easel unit and then slid back in a generally horizontal direction while tilting towards the vertical until it clears the upper corner of the back wall 58 of the receptacle body, which may be bevelled off to assist in this operation, following which the top is dropped vertically into its position of rest. When the top is fully open, its greater portion lies below and behind the receptacle body, out of the way of the teacher and obstructing no one's view of the exercise. To accomplish this, each track 57 comprises vertical runs $a$, $b$ at both ends connected near the top of the side wall by a generally horizontal run $c$ with an inclined portion $d$ at its front and a rounded square corner $e$ at its rear intersection with the upper ends of the front and rear runs, respectively, as shown in Fig. 1.

An important instrumentality in my system is the special chart which I have devised for teaching memory subjects visually, and which may be printed with various backgrounds and utilized with the aid of movable symbols, names or pictures having to do with the subject in hand. Examples are music, for which movable notes and symbols may be used advantageously on a printed staff background, the letters of the alphabet and Arabic numerals adapted for display in selected horizontal and vertical lines, and names and pictures of animals and other creatures, historic and geographic names and indicia, and related activities and characteristics useful in school instruction subject matter, or of interest to small children.

Other subjects than those illustrated that can be taught in like manner involving the use of all five senses and their interpretation and rationalization will occur to teachers and schoolmen concerned with stimulating the interest of pupils under their charge or observation.

I claim the following as my invention:

1. A combined display fixture and chart holder comprising a hollow base having side and rear walls surmounted by members forming an open frame around its top edges, a top hinged at its front edge to the front frame member, a removable front wall having an upstanding bead engaging in a groove in the under side of said front frame member, latch members pivotally secured on the under side of said front frame member engaging in grooves on the front face of said removable front wall to secure it in closed position, a brace hinged at one end to an edge of said top to fold under it in closed position, and means associated with said frame engaging the free end of said brace in open position of said top to support the latter in desired angular adjustment, said top having marginal retaining means for the edges of a chart of the full size of said hollow base between its walls.

2. A receptacle comprising a body having side and rear walls and an open top, a cover for said top having a front wall section depending from its front edge and depending wings embracing said side walls, aligning pivot members projecting inwards from said wings intermediate their front and rear margins and slidably engaging in slots in the outer faces of said side walls, each said slot having two vertical end runs (one at each end) connected at their upper ends by a horizontal run extending downwardly at its forward end, whereby said cover is held against sliding in its closed position but may be lifted at its front edge enough for its front wall section to clear said body, whereupon it can slide rearwards in partly raised position until its under side clears said rear wall and it can tilt into a vertical position and drop into place behind said rear wall.

References Cited in the file of this patent

UNITED STATES PATENTS

| | | |
|---|---|---|
| 151,182 | Wernicke | May 19, 1874 |
| 393,934 | Talbott | Dec. 4, 1888 |
| 468,929 | Cochrane | Feb. 16, 1892 |
| 637,456 | Goodale | Nov. 21, 1899 |
| 676,127 | Fox | June 11, 1901 |
| 736,960 | Gusinde | Aug. 25, 1903 |
| 880,023 | Harding | Feb. 25, 1908 |
| 1,100,983 | Miles | June 23, 1914 |
| 1,140,589 | Gilbreath et al. | May 25, 1915 |
| 1,142,651 | Winiecki | June 8, 1915 |
| 1,337,937 | Maxwell | Apr. 20, 1920 |
| 1,392,726 | Watkins | Oct. 4, 1921 |
| 1,497,379 | Morse | June 10, 1924 |
| 1,735,078 | Hance | Nov. 12, 1929 |
| 2,072,511 | Ross | Mar. 2, 1937 |
| 2,295,954 | Kustodowich et al. | Sept. 15, 1942 |
| 2,362,877 | Bargen | Nov. 14, 1944 |
| 2,569,254 | Page | Sept. 25, 1951 |
| 2,700,587 | Godfrey | Jan. 25, 1955 |